(12) United States Patent
Krishna et al.

(10) Patent No.: US 12,296,833 B2
(45) Date of Patent: May 13, 2025

(54) SYSTEM AND METHOD FOR PROVIDING AN INDICATION OF DRIVING PERFORMANCE

(71) Applicant: Webfleet Solutions B.V., Amsterdam (NL)

(72) Inventors: Seshadri Arjun Krishna, Stuttgart (DE); Paul Roeland Verheijen, Amsterdam (NL); Jasper Johannes Anthonius Pauwelussen, Amsterdam (NL)

(73) Assignee: Bridgestone Mobility Solutions, B.V., Amsterdam (NE)

( * ) Notice: Subject to any disclaimer, the term of this patent is extended or adjusted under 35 U.S.C. 154(b) by 231 days.

(21) Appl. No.: 17/299,013

(22) PCT Filed: Dec. 3, 2019

(86) PCT No.: PCT/EP2019/083561
§ 371 (c)(1),
(2) Date: Jun. 2, 2021

(87) PCT Pub. No.: WO2020/115081
PCT Pub. Date: Jun. 11, 2020

(65) Prior Publication Data
US 2022/0041169 A1    Feb. 10, 2022

(30) Foreign Application Priority Data

Dec. 3, 2018   (GB) .................................... 1819674
Dec. 3, 2018   (GB) .................................... 1819678

(51) Int. Cl.
*B60W 40/105*    (2012.01)
*B60W 40/112*    (2012.01)
*G01C 21/34*     (2006.01)

(52) U.S. Cl.
CPC ........ *B60W 40/105* (2013.01); *B60W 40/112* (2013.01); *G01C 21/3469* (2013.01)

(58) Field of Classification Search
CPC ............. B60W 40/105; B60W 40/112; B60W 2050/146; B60W 2520/10;
(Continued)

(56) References Cited

U.S. PATENT DOCUMENTS

| 5,948,026 A | 9/1999 | Beemer, II |
| 2003/0216847 A1* | 11/2003 | Bellinger ................ F16H 61/66 701/72 |

(Continued)

FOREIGN PATENT DOCUMENTS

| CN | 204895347 U | 12/2015 |
| JP | 2008162380 A | 7/2008 |

(Continued)

OTHER PUBLICATIONS

International Searching Authority: Search report for corresponding International Patent Application No. PCT/EP2019/083561 dated Mar. 24, 2020, 5 pages.
Ritzëu, Emil: "Adaptive Vehicle Weight Estimation," Thesis for Degree of Master of Science, Department of Electrical Engineering, Division of Vehicular Systems, Linköping University, Jan. 30, 1998, 45 pages.

(Continued)

*Primary Examiner* — Sihar A Karwan
(74) *Attorney, Agent, or Firm* — Patterson Intellectual Property Law, PC

(57) ABSTRACT

A method of providing an indication of driving performance involves obtaining a forward acceleration and speed of a vehicle. A forward acceleration threshold value is identified for use in identifying excessive forward acceleration of the vehicle based on the determined speed of the vehicle. For any vehicle speed within a range of vehicle speeds, the acceleration threshold value is defined by a function based on the determined speed of the vehicle, wherein the forward acceleration threshold value according to the function varies (Continued)

continually with vehicle speed over the range of vehicle speeds. The determined forward acceleration of the vehicle is compared with the determined acceleration threshold value, and an indication of an excessive forward acceleration driving event is generated when the determined forward acceleration exceeds the determined acceleration threshold value.

18 Claims, 5 Drawing Sheets

(58) Field of Classification Search
CPC .......... B60W 2520/105; B60W 40/09; B60W 50/14; G01C 21/3469; G07C 5/008; G07C 5/0816; G01P 15/0891
See application file for complete search history.

(56) References Cited

U.S. PATENT DOCUMENTS

| | | | |
|---|---|---|---|
| 2011/0202305 A1* | 8/2011 | Willis ................. | G01C 21/188 702/141 |
| 2013/0054107 A1* | 2/2013 | Harvie ................ | G01G 19/086 701/99 |
| 2017/0305435 A1 | 10/2017 | Verheijen et al. | |
| 2018/0025636 A1* | 1/2018 | Boykin ............ | G08G 1/096725 701/1 |

FOREIGN PATENT DOCUMENTS

| | | |
|---|---|---|
| JP | 2008221969 A | 9/2008 |
| WO | 2011003461 A1 | 1/2011 |
| WO | 2012137016 A2 | 10/2012 |
| WO | 2016083543 A1 | 6/2016 |

OTHER PUBLICATIONS

Kiencke, Uwe et al: "Automotive Control Systems for Engine, Driveline, and Vehicle," 2nd Ed., ISBN 3-540-23139-0, Springer Berlin Heidelberg, New York, Nov. 2004, pp. 5-521 (This document was divided into five parts and uploaded as 2_A, 2_B, 2_C, 2_D and 2_E.).

Vahidi, A., et al.: Recursive least squares with forgetting for online estimation of vehicle mass and road grade: theory and experiments; Vehicle System Dynamics, vol. 43 No. 1, Jan. 2005, pp. 31-55, 26 pages.

Lundin, Björn, et al.: Estimation of Vehicle Mass Using an Extended Kalman Filter, Master of Science Thesis, Department of Signals and Systems, Division of Automatic Control, Automation and Mechatronics, Chalmers University of Technology, Gothenburg, Sweden, 2012, Report No. EX037/2012, 39 pages.

Gonder, Jeffrey, et al.: Final Report on the Fuel Saving Effectiveness of Various Driver Feedback Approaches, National Renewable Energy Laboratory Milestone Report, NREL/MP-5400-50836, Mar. 2011, 31 pages.

Alexander, S.T., et al.: Analysis of a Recursive Least Squares Hyperbolic Rotation Algorithm for Signal Processing, Linear Algebra and Its Applications—98:3-40 (1988), Elsevier Science Publishing Co., Inc. 1988, 52 Vanderbilt Ave., New York, NY 10017, 38 pages.

World Health Organization: Global Status Report on Road Safety 2013: Supporting a Decade of Action, WHO Library Cataloguing-in-Publication Data,ISBN 978 92 4 156456 4, Luxembourg, Sweden, 39 pages.

Intellectual Property Office: Search Report for Application No. GB1819674.1 dated Jun. 4, 2019 4 pages.

Intellectual Property Office: Search Report for Application No. GB1819678.2 dated Jun. 3, 2019, 3 pages.

* cited by examiner

A : current vehicle state data (OBD data and data derived therefrom)

B : driving events

C : aggregated events for determining performance indicators

D : statistics based on determined performance indicators

E : report data with determined performance indicators

SYSTEM AND METHOD FOR PROVIDING AN INDICATION OF DRIVING PERFORMANCE

FIELD OF THE INVENTION

The present invention relates to methods and systems for providing an indication of driving performance, in particular in relation to identifying excessive acceleration of a vehicle. The invention, according to some aspects and embodiments, is concerned with identifying excessive forward acceleration of a vehicle. In other aspects and embodiments, the invention is concerned with automatically estimating the mass of a vehicle based on a determined rate of fuel consumption.

BACKGROUND TO THE INVENTION

Navigation devices that include global navigation satellite system (GNSS) signal reception and processing functionality are well known and are widely employed as in-car or other vehicle navigation systems. In general terms, a modern navigation device may comprise a processor, memory (at least one of volatile and non-volatile, and commonly both), and map data stored within said memory. Such navigation devices are generally able to process GNSS location data, such as GPS (Global Positioning System) location data, in order to determine a current location of the device.

Such navigation devices often also include, or have access to, one or more accelerometers that are capable of producing signals that can be processed to determine the current acceleration of the device (and hence of the vehicle within which the device is mounted). These acceleration signals may be used in turn, often in conjunction with other location information, derived from the GPS signal, for example, to determine the speed and relative displacement of the device (vehicle). The accelerometer data may thus be used to supplement the navigation functionality of the vehicle navigation system and the one or more accelerometers may be provided alongside, or as part of, the navigation system.

In other cases, the one or more accelerometers may be provided in a separate "black box" that does not provide any navigation function but instead merely logs acceleration data (and optionally other vehicle data). This data can then be stored and/or transmitted to a remote (central) server, for example, for monitoring purposes. For instance, such devices, which may generally be referred to as telematics control units (TCUs), are often provided for the purpose of monitoring fleets of commercial vehicles such as lorries, buses, taxis, and the like, and/or for providing feedback to a driver. The data may be used to provide feedback to a driver via a navigation device of the driver. The TomTom® LINK devices are examples of such telematic control units.

Accelerometer data may, regardless of where it is produced, alternatively or additionally be provided to on-board autonomous or advanced driver-assistance modules.

In order to provide an accurate acceleration measurement, the accelerometer must be calibrated, such that the raw accelerometer data in the coordinate frame of the accelerometer system can be transformed into the coordinate frame of the vehicle. Various techniques may be used to achieve this. One such method is described in WO 2011/003461 A1 entitled "Accelerometer system and method", and published 13 Jan. 2011, that involves collecting a plurality of acceleration samples during vehicle standstill and using the samples to compute an average gravitation vector. Based on this average gravitation vector, the angle of rotation between the accelerometer and the horizontal vehicle plane can thus be determined.

However it is obtained (and calibrated), e.g. from a telematics device associated with the vehicle, from a navigation device or otherwise, data indicative of the acceleration of a vehicle may be used in identifying certain driving events, such as harsh braking or acceleration, swerving or other emergency manoeuvres, as well as for vehicle crash detection, standstill detection, vehicle theft, and so on. The identification of such driving events may be useful when monitoring driver behaviour. Driving events may be identified based upon obtained acceleration data, e.g. by a telematics device of the vehicle, an on-board autonomous or advanced driver-assistance module thereof, or a remote server. Identified driving events may be used in various applications, such as: monitoring driver behaviour in the context of fleet management; by an autonomous or advanced driver assistance module in order to improve (or modify) the driving experience; and/or in providing feedback to the driver as to how they might adopt a more responsible and efficient driving style, e.g. via an on-board vehicle display, such as a display of a navigation device of the vehicle.

Driving events may be identified based on processing obtained (and calibrated) acceleration data. When excessive acceleration is detected, a driving event may be generated, e.g. if the excessive acceleration exceeds a predetermined duration, etc. By considering the direction and magnitude of acceleration in the X-Y plane of the vehicle, it is possible to differentiate between "forward acceleration", "braking" and "cornering".

In one example, a TomTom® LINK device is arranged to detect two types of driving event: harsh steering, and harsh braking. When such an event is detected, a notification appears on the display of a navigation device of the vehicle, indicating the severity of the driving event based on a severity determined by the LINK device. Data indicative of the driving event may also be transmitted to a remote server for use in remote monitoring of the drivers behaviour e.g. for use by a fleet manager.

In these arrangements, the telematics device is arranged to detect excessive acceleration indicative of harsh steering, i.e. cornering, or harsh braking, based on predefined (minimum) acceleration thresholds. The applicable threshold is selected dependent upon vehicle speed, and optionally a vehicle class, which is indicative of vehicle weight, e.g. lightweight, mediumweight, or heavyweight. For example, a "harsh braking" event may be considered to occur when a vehicle is travelling at a speed in a first predefined range and the magnitude of acceleration exceeds a first predefined threshold for a predetermined period of time. When the vehicle is travelling at a speed in a second higher predefined speed range, the braking event is recognised when the magnitude of acceleration exceeds a second, higher predefined threshold for more than the predetermined period of time, and so on. Thus, in these arrangements, the same, fixed first predefined acceleration threshold is used in detecting a braking event, when the speed of the vehicle is anywhere within the first predefined speed range, and the same, fixed second predefined threshold is used in detecting a braking event when the speed of the vehicle is anywhere within the second predefined speed range. The threshold used in respect of a speed range is the same whatever the speed of the vehicle within that range i.e. the first and second predefined acceleration thresholds are constant. The same arrangement, using predefined minimum acceleration thresholds selected based upon vehicle speed is also used when detecting a harsh cornering event.

An identified driving event may be assigned a severity level based on the magnitude of acceleration in comparison to the applicable predefined threshold, i.e. the extent to which the acceleration exceeds the threshold, and a duration of the event. Thus, for both harsh steering and harsh braking type events, the identification of the event is based upon acceleration threshold values which are predefined, and selected based on speed.

The Applicant has recognised that such techniques in which a driving event is identified based upon excessive acceleration detected using a predefined, fixed minimum acceleration threshold selected based upon vehicle speed, with the same threshold being used throughout a range of vehicle speeds, may not be appropriate for identifying a driving event that is based on forward acceleration due to the dynamics of a moving vehicle.

SUMMARY OF THE INVENTION

In accordance with a first aspect of the invention there is provided a method of providing an indication of driving performance, comprising:
  obtaining a forward acceleration and speed of a vehicle;
  determining an acceleration threshold value based on the obtained speed of the vehicle, wherein, for any vehicle speed within a range of vehicle speeds, the acceleration threshold value is defined by a function based on the obtained speed of the vehicle, wherein the acceleration threshold value according to the function varies continually with vehicle speed over the range of vehicle speeds;
  comparing the obtained forward acceleration of the vehicle with the determined acceleration threshold value; and
  generating an indication of an excessive forward acceleration driving event when the determined forward acceleration exceeds the determined acceleration threshold value.

Thus, in accordance with the invention, rather than using an acceleration threshold which is constant as vehicle speed varies over a range of vehicle speeds, as used in some conventional techniques for determining excessive acceleration driving events in relation to braking or steering, the acceleration threshold used in identifying an excessive forward acceleration driving event is defined by a function based on the determined speed of the vehicle, such that the acceleration threshold value continuously varies with respect to vehicle speed over the range of vehicle speeds. It has been found that an acceleration threshold which varies in this manner with respect to vehicle speed may provide an appropriate threshold for identifying excessive forward acceleration over a relatively wide range of vehicle speeds. The acceleration threshold is in respect of forward acceleration, and may be referred to as a "forward acceleration threshold". In embodiments, the threshold for a given vehicle speed is different to a threshold or thresholds used to determine excessive braking and/or cornering.

The present invention also extends to a system for performing such a method. Accordingly, from a second aspect there is provided a system for providing an indication of driving performance, comprising:
  means for obtaining a forward acceleration and speed of a vehicle;
  means for determining an acceleration threshold value based on the obtained speed of the vehicle, wherein, for any vehicle speed within a range of vehicle speeds, the acceleration threshold value is defined by a function based on the obtained speed of the vehicle, wherein the acceleration threshold value according to the function varies continually with vehicle speed over the range of vehicle speeds;
  means for comparing the obtained forward acceleration of the vehicle with the determined acceleration threshold value; and
  means for generating an indication of an excessive forward acceleration driving event when the determined forward acceleration exceeds the determined acceleration threshold value.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors and/or processing circuitry. In general, any of the steps described in relation to the method or system may be performed using individual processing circuitry (stages), or using shared processing resource.

In general, it will be appreciated that the various functions of the invention described herein can be carried out in any desired and suitable manner. For example, the steps and functions of the invention described herein can be implemented in hardware or software, as desired. Thus, for example, unless otherwise indicated, the various processing circuitry, functional elements, stages, and "means" of the invention described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

Excessive (i.e. harsh) forward acceleration has been found to be an important parameter in assessing driving performance, as excessive forward acceleration may be a precursor to rash driving and may be associated with excessive fuel consumption. By selecting acceleration thresholds for use in identifying when excessive forward acceleration has occurred in accordance with the present invention, indications of excessive acceleration driving events may be generated.

The acceleration threshold value according to the function preferably defines a curve over the range of vehicle speeds. Thus, the acceleration threshold value may vary non-linearly over the range of speeds.

The Applicant has recognised that the ability of a vehicle to accelerate in the forward direction decreases with increasing speed. Thus, the threshold for identifying excessive forward acceleration should be smaller for higher vehicle speeds. The acceleration threshold value defined by the function therefore decreases with increasing vehicle speed over the range of vehicle speeds.

It has been found that the acceleration threshold for use in identifying excessive forward acceleration may advantageously emulate this relationship. Thus, in embodiments, the function for defining the acceleration threshold emulates the relationship between vehicle speed and acceleration in a vehicle when the engine is operating at maximum power output. The function may be obtained using a simplified model of longitudinal vehicle dynamics.

The function may include an aerodynamic drag component, a rolling resistance component and an inertial resistance component. Optionally the function may include a climbing resistance component. However, it is found that the climbing resistance component may be omitted to simplify the calculation, e.g. if data indicative of the gradient of a road being traversed by the vehicle is not readily available. In contrast, accelerometer and vehicle speed data is available, e.g. from a telematics device or navigation device associated with the vehicle.

In some embodiments, when the climbing resistance component is omitted, the acceleration threshold A is given by:

$$A = \frac{\frac{1}{2}\rho C_x S_x(v_1^3 - v^3) + mgf(v_1 - v) + \delta m a_1 v_1}{\delta m v} \text{ for } v \geq v_1, \quad \text{Eqn. 1A}$$

and optionally $v < v_2$

In other embodiments, when the climbing resistance component is included, the acceleration threshold A is given by:

$$A = \quad \text{Eqn. 1B}$$
$$\frac{\frac{1}{2}\rho C_x S_x(v_1^3 - v^3) + mgf(v_1 - v) + \delta m a_1 v_1 + mg\sin\alpha}{\delta m v} \text{ for } v \geq$$

$v_1$, and optionally $v < v_2$ where:

| Parameter | Description | Unit |
| --- | --- | --- |
| $\rho$ | Density of air (1.22) | kg/m$^3$ |
| $C_x$ | Air drag coefficient | — |
| $S_x$ | Surface area | m$^2$ |
| v | Speed | m/s |
| m | Mass of the vehicle | kg |
| g | Gravitational acceleration (9.81) | m/s$^2$ |
| f | Rolling resistance coefficient | — |
| $\delta$ | Inertial coefficient | — |
| a | Forward acceleration | m/s$^2$ |
| $\alpha$ | Gradient of road in degrees or rad | ° or rad |

The range of vehicle speeds over which the acceleration threshold is defined by the function may be selected as desired, and includes a continuous range of speeds. It has been found that an appropriate acceleration threshold may be defined in accordance with the function described herein over a relatively wide range of vehicle speeds. For example, the range of vehicle speeds may encompass vehicle speeds differing by at least 20 km/hr, or at least 30 km/hr, or at least 50 km/hr. For example, by way of illustration only, the range may correspond to a range of from 30-90 km/hr.

The range of vehicle speeds may be a range of speeds having a lower limit defined by a predefined vehicle speed. The predefined vehicle speed is greater than zero.

In preferred embodiments the function is based on a pair of predefined acceleration and speed values and is defined such that, when the determined speed is the predefined speed value, the acceleration threshold is the predefined acceleration value. Preferably the predefined speed value of the predefined pair of acceleration and speed values corresponds to a lower limit of the range of vehicle speeds. The pair of predefined acceleration and speed values may be set as desired, e.g. based on experimental observations.

Where a function emulating longitudinal vehicle dynamics, referred to herein as a "power curve", is used, the acceleration threshold would increase exponentially with decreasing vehicle speed for lower vehicle speeds. This may no longer provide a realistic threshold for identifying excessive forward acceleration. Thus, it may be appropriate to define a vehicle speed indicative of a starting point at which the function should start to be used to define a forward acceleration threshold. The predefined pair of acceleration threshold and speed values preferably define a starting point for the function. The pair of values may represent a state of the vehicle at which the function becomes applicable. The definition of a lower limit of vehicle speed at which the acceleration threshold is to be determined using the function is also advantageous in providing the ability to standardise the function, making it applicable to vehicles having different maximum power outputs. The lower limit of vehicle speed, or the predefined speed value, e.g. $v_1$, is a non-zero speed value.

It has been found that it may be more appropriate to use a constant acceleration threshold for vehicle speeds below a lower limit of the range of speeds and hence, in embodiments in which the predefined speed value corresponds to the lower limit of the range of vehicle speeds, below the predefined speed value. In embodiments, the acceleration threshold value is defined by a constant predefined threshold value for vehicle speeds below the lower limit of the range of vehicle speeds, or, in embodiments, below the predefined speed value. The constant predefined acceleration threshold value preferably corresponds to the acceleration value of the predefined pair of acceleration and speed values. Thus, in embodiments, the predefined acceleration threshold value at the predefined vehicle speed is also used for vehicle speeds below the lower limit of the range of vehicle speed, or, in embodiments, below the predefined speed value. The same constant predefined threshold value is used over a range of vehicle speeds below the lower limit of the range of predefined vehicle speeds, or the predefined speed value. The range of vehicle speeds may start from zero speed, and may include all speed values up to the lower limit of the range e.g. the predefined speed value.

In some embodiments, the range of vehicle speeds over which the function is used to determine the acceleration threshold has an upper limit e.g. $v_2$. In embodiments, where the vehicle speed exceeds the upper limit, a constant acceleration threshold is used. This may provide a more realistic threshold in a region where the acceleration threshold value obtained by the function would otherwise start to drop to very low values, resulting in a large number of false positive determinations of excessive forward acceleration. It is also desirable to avoid values of the acceleration threshold which are so low that the inherent error in acceleration measurements becomes significant. The constant acceleration threshold may correspond to the acceleration threshold value defined by the function for the vehicle speed defining the upper limit of the speed range.

In these embodiments, the function may be based on first and second pairs of predefined acceleration and speed values, and be defined such that, when the determined speed is the predefined speed value of either one of the first and second pairs of predefined acceleration and speed values, the acceleration threshold is the predefined acceleration value of the applicable pair of predefined acceleration and speed values. The first predefined pair of acceleration and speed values may correspond to the predefined pair of acceleration and speed values described above i.e. where the predefined speed value corresponds to a lower limit of the range of vehicle speeds over which the function is applicable. The first and second pairs of predefined acceleration and speed values may respectively define the start and end points of the function. Each pair of values represents a state of the vehicle. The speed defining the upper limit of the speed range e.g. of the second pair of predefined acceleration and speed values (and also the associated acceleration value) may be selected as desired e.g. based on experimental observation, or taking into account error in the accelerometer measurements, so as to avoid being in a range where the acceleration threshold values according to the function would become too low.

By "constant acceleration threshold" herein, it is meant that the threshold remains constant as vehicle speed varies over a (continuous) range of vehicle speeds.

The indication of the excessive acceleration driving event may be generated whenever the determined forward acceleration exceeds the determined acceleration threshold value. However, in other embodiments, the indication is generated only when one or more further criteria are met. In some preferred embodiments the indication of an excessive acceleration driving event is generated when the determined forward acceleration exceeds the determined acceleration threshold value for more than a predetermined time period, such as 3 seconds.

It may be desirable to be able to determine a severity of any excessive forward acceleration driving event. In embodiments the method comprises determining a plurality of forward acceleration threshold values for use in identifying excessive forward acceleration of the vehicle based on the determined speed of the vehicle, wherein each forward acceleration threshold value is in respect of a different severity level, and each severity level is associated with a respective pair of predefined acceleration and speed values, wherein each forward acceleration threshold value is obtained using the function with the applicable pair of predefined acceleration and speed values. The pair of predefined acceleration and speed values may be a first pair of such values as described above, e.g. indicative of a start point of the function or a lower limit of the range of speeds. Each severity level may be associated with first and second pairs of predefined acceleration and speed values as described above. The method may comprise, comparing the determined forward acceleration of the vehicle with each determined forward acceleration threshold value, and generating an indication of an excessive forward acceleration driving event when the determined forward acceleration exceeds any one of the determined forward acceleration threshold values, and generating an indication of the severity of the excessive forward acceleration driving event based upon the results of the comparison. For example, an indication of the severity of the excessive forward acceleration driving event may be based upon the highest excessive forward acceleration threshold value exceeded. A severity of an excessive forward acceleration driving event may optionally be based upon additional factors e.g. a duration of the driving event.

The forward acceleration threshold(s) may be set such that an excessive forward acceleration driving event is triggered more readily, and/or is assigned a greater severity, when at moderate and high vehicle speeds than at lower vehicle speeds. This may be achieved in accordance with the invention by using thresholds as defined by the function which decrease with increasing vehicle speed.

A generated indication of an excessive acceleration driving event, and, where applicable, a generated indication of the severity of the event may be used in any suitable manner. The following is also applicable to a driving performance indicator generated in accordance with the further aspects described below based on estimated vehicle mass. In accordance with any of the aspects of the invention the method may comprise transmitting the generated indication(s) to one or more of: a remote server, an autonomous or advanced driver assistance system of the vehicle, or to a navigation device of the vehicle. The generated indication(s) may be used in providing feedback to the driver, e.g. via a navigation device of the vehicle. For example, the method may comprise using the generated indication(s) to display output to a user indicative of the harsh acceleration driving event, e.g. via a navigation device of the vehicle, and, where applicable, its severity. Alternatively or additionally the method may comprise transmitting the generated indication (s) for use in monitoring driver behaviour, e.g. to a remote server and/or to an autonomous or advanced driver assistance system of the vehicle. Alternatively or additionally, the method may be performed entirely at a server based on forward acceleration and speed values received from a communications device in the vehicle.

It will be appreciated that the function used in determining the forward acceleration threshold value(s) is dependent upon vehicle mass. In some embodiments, a vehicle mass value is obtained for use in the function by selecting a predefined mass based upon vehicle class. For example, a number of vehicle classes may be predefined, each associated with a predefined vehicle mass. The user may be able to manually update the mass of the vehicle, where the exact value is known. However, the Applicant has recognised that the mass of a vehicle, particularly in the context of operational fleets, may fluctuate greatly, for example depending upon the size of the load the vehicle is carrying, number of passengers and/or fuel load. To address this issue, and be able to provide a more accurate estimate of mass, the driver may be able to select an intermediate value between predefined minimum and maximum mass values for a particular vehicle class, e.g. as a percentage, based upon the perceived load of the vehicle.

However, it would be preferable to instead enable the mass of the vehicle to be automatically estimated. One method for estimating the mass of a vehicle is disclosed in WO 2012/137016 A2 entitled "Method and apparatus for estimating the fuel consumption of a vehicle", and published 11 Oct. 2012, in the context of providing a mass estimate for use in estimating fuel consumption. Such a method may be used in conjunction with the methods disclosed herein. However, in preferred embodiments, the function used to provide the acceleration threshold is dependent upon the mass of the vehicle, and the method comprises automatically estimating a mass of the vehicle for use in the function using data indicative of a fuel consumption of the vehicle.

It is believed that such techniques for estimating vehicle mass based on instantaneous fuel consumption are advantageous in their own right, independent of the methods described herein for identifying excessive forward acceleration of a vehicle. For example, the ability to estimate vehicle mass may be useful in determining other performance indicators indicative of braking or steering of the vehicle, or providing a warning if the vehicle is overloaded, etc.

In accordance with a further aspect of the invention, there is provided a method of, preferably automatically, estimating a mass of a vehicle, comprising:
   obtaining data indicative of the fuel consumption of the vehicle; and
   using the fuel consumption data to determine the mass of the vehicle.

The present invention extends to a system for carrying out a method in accordance with any of the aspects or embodiments of the invention herein described.

In accordance with a further aspect of the invention there is provided a system for, preferably automatically, estimating a mass of a vehicle, comprising:
   means for obtaining data indicative of the fuel consumption of the vehicle; and
   means for using the fuel consumption data to determine the mass of the vehicle.

The present invention in accordance with these further aspects may include any or all of the features described in relation to the earlier aspects of the invention to the extent that they are not mutually exclusive, and vice versa.

In these further aspects of the invention, the estimated mass may be used in generating one or more driving performance indications in respect of the vehicle. The estimated mass used in this way may be an average mass based upon multiple estimations, or a single mass estimation, as discussed below. A performance indication may be indicative of a driving event, e.g. harsh cornering, harsh acceleration, harsh steering, or harsh braking. Thus, the performance indications are not limited to forward acceleration related indications as in the earlier aspects of the invention. The performance indication(s) may be used in a similar manner to the forward acceleration related indications in relation to the earlier aspects e.g. to provide feedback to a driver and/or for monitoring of driver behaviour. The estimated mass may be used directly or indirectly in generating the performance indication. The method may comprise using the estimated mass in obtaining one or more thresholds for use in determining the one or more driving performance indications. The one or more thresholds may be acceleration thresholds. For example, the mass may be used to obtain a function or threshold for use in generating the performance indication, such as the function used in the earlier aspects of the invention. There are numerous applications in which it is useful to know an accurate value of vehicle mass, or to be able to obtain dynamic mass data. Thus, the mass need not be used in the context of obtaining driving performance indications, and may or may not be used as part of a calculation. For example, in some contexts, e.g. where vehicle mass is regulated, knowledge of the mass value of the vehicle is, in itself, useful.

In accordance with the invention in any of its aspects or embodiments which involve estimating a mass of the vehicle based upon fuel consumption, the method may comprise obtaining data indicative of the fuel consumption of the vehicle with respect to time. The term "fuel consumption" herein refers to the instantaneous fuel consumption rate. The method may comprise estimating the mass of the vehicle at each one of a plurality of different times. The fuel consumption data may be time stamped fuel consumption data.

The fuel consumption data may be obtained from any suitable source. The fuel consumption data may be real-time data. Thus the mass estimation may be a real-time mass estimation. A live feed of the fuel consumption data may be obtained. In some embodiments the fuel consumption data is obtained from data transmitted over a digital network of the vehicle, such as CAN (Controller Area Network). The data may be data transmitted over a communication bus, e.g. a CAN bus of the vehicle. The data may be obtained from the digital network of the vehicle by a telematics control unit (TCU) of the vehicle.

Estimation of the mass of a vehicle based on fuel consumption of the vehicle requires an estimate of the efficiency of the engine. The efficiency of the engine is dependent upon the forward acceleration and speed of the vehicle. In embodiments, the estimation of the mass of the vehicle further comprises using data indicative of the forward acceleration and speed of the vehicle.

The estimation of the mass of the vehicle using fuel consumption data may be performed at one or more times. The one or more times may be times during a single trip. The times may be predetermined intervals, and/or the estimation of mass may be continually updated, i.e. based on real-time fuel consumption data. An average mass may be determined based upon the multiple mass estimations in respect of a plurality of different times. The estimation of mass for a given time may be based on the fuel consumption, forward acceleration and speed of the vehicle at the given time.

Alternatively or additionally, the estimation of mass may be performed when a determined forward acceleration and optionally speed of the vehicle meets certain criteria.

In embodiments of the first and second aspects of the invention, the vehicle mass used in the function, (or, in embodiments of the further aspects of the invention, the estimated vehicle mass used more generally in generating a performance indication), may be the vehicle mass estimated based on the fuel consumption for the current time. The vehicle mass may be used together with the current acceleration and vehicle speed in the function (or in generating a performance indication). Thus, the vehicle mass may be a real-time determined vehicle mass. Alternatively, the vehicle mass may be a most recently determined estimated vehicle mass, or a most recently determined average mass i.e. based upon multiple vehicle mass estimations. For example, a rolling average of a number of the most recent mass estimations, e.g. the preceding 5 mass estimations, may be maintained.

The mass of the vehicle may be determined in accordance with the following equation:

$$m = \frac{\frac{f_{rate}\eta_t C}{v} - \frac{1}{2}\rho C_x S_x v^2 - F_b}{g\sin\alpha + \delta a + gf} \qquad \text{Eqn. 2}$$

where:

| Parameter | Description | Unit |
|---|---|---|
| $f_{rate}$ | Rate of fuel consumption | kg/s |
| $\eta_t$ | Tank to wheel efficiency | — |
| C | Fuel calorific value | J/kg |
| $\rho$ | Density of air (1.22) | kg/m$^3$ |
| $C_x$ | Air drag coefficient | — |

| Parameter | Description | Unit |
|---|---|---|
| $S_x$ | Surface area | $m^2$ |
| v | Speed | m/s |
| m | Mass of the vehicle | kg |
| g | Gravitational acceleration (9.81) | $m/s^2$ |
| f | Rolling resistance coefficient | — |
| δ | Inertial coefficient | — |
| a | Forward acceleration | $m/s^2$ |
| α | Gradient of road in degrees or rad | ° or rad |
| $F_b$ | Braking force | N |

According the equation to estimate the mass may include an aerodynamic drag component, a rolling resistance component and an inertial resistance component. Optionally the function may include a climbing resistance component. However, it is found that the climbing resistance component may be omitted to simplify the calculation, e.g. if data indicative of the gradient of a road being traversed by the vehicle is not readily available. Optionally the function may include a braking force component.

In practice, to simplify the calculation, a may be taken to be zero. This avoids needing to take into account the slope of the road, where such data is not readily available. It is also possible to ignore the braking force, $F_b$. It has been found that, when the determined forward acceleration of a vehicle is above a predefined threshold, and optionally the speed of the vehicle is above a predefined threshold, the engine may be assumed to be at (or near) its highest efficiency. Basing the estimation of mass upon such forward acceleration and optionally speed values may therefore simplify the estimation of mass, enabling it to be assumed that the engine is at or near its highest efficiency.

The method may comprise obtaining data indicative of the forward acceleration, speed and fuel consumption of the vehicle at different times, identifying one or more times at which (at least) the forward acceleration is above a predefined threshold, and optionally the speed of the vehicle is also above a predefined threshold, and using the acceleration, speed and fuel consumption of the vehicle in respect of each identified time to obtain an estimate of the mass of the vehicle for the time. The forward acceleration and optionally vehicle speed data may be filtered to identify the data above the or each predefined threshold, and hence identify the one or more times at which the forward acceleration and optionally speed of the vehicle is above a respective predefined threshold. Thus a subset of the forward acceleration and optionally vehicle speed data may be used. The predefined thresholds for the forward acceleration and, where applicable, speed data, may be set as appropriate. The predefined threshold for forward acceleration in respect of mass estimation is a different predefined threshold to that used in identifying excessive forward acceleration as discussed in relation to the first and second aspects of the invention above.

Preferably a mass is estimated based on the acceleration, speed and fuel consumption of the vehicle at each one of a plurality of times at which (at least) the forward acceleration is above a predefined threshold, and optionally the speed of the vehicle is also above a predefined threshold. The plurality of times may be times during a single trip. The method may comprise determining an average mass based upon the plurality of mass estimations. This average mass may then be used, for example, in generating a performance indication e.g. for deriving a function for use in so doing. In this way, the mass estimate may be refined by taking an average of individual mass estimations taken at different times, e.g. during a trip.

In other embodiments, rather than selecting times at which to estimate mass based on the forward acceleration and optionally speed of the vehicle, which enable an assumption as to maximum efficiency of the vehicle to be made, an efficiency value for use in mass estimation may be determined. This may be done in any suitable manner. For example, an average efficiency applicable to all vehicles may be determined based on data collected in respect of a large sample of vehicles.

The forward acceleration of the vehicle used in accordance with the invention in any of its aspects or embodiments may be determined in any suitable manner. The forward acceleration may be determined using acceleration measurements obtained by an accelerometer system associated with the vehicle. The acceleration measurements may be processed in order to obtain the forward acceleration for use in the method of the invention. For example, the accelerometer measurements obtained in the coordinate frame of the accelerometer system may be transformed into the coordinate frame of the vehicle. This may be achieved in any suitable manner. For example, as described in WO 2011/003461 A1, a plurality of acceleration samples are collected during vehicle standstill and used to compute an average gravitation vector. Based on this average gravitation vector, the angle of rotation between the accelerometer and the horizontal vehicle plane can thus be determined. In another exemplary method, a plurality of acceleration measurements are obtained from the accelerometer while the vehicle is moving, each measurement being representative of acceleration as measured within a co-ordinate frame of the accelerometer system, and the distribution of the acceleration measurements used to determine an orientation of the accelerometer system relative to the vehicle within which it is installed.

The forward acceleration may be determined using acceleration measurements obtained by an accelerometer system of a telematics control unit (TCU) associated with the vehicle. The speed of the vehicle may similarly be determined based on vehicle speed data obtained from a telematics control unit of the vehicle. However, it is not necessary that the forward acceleration and vehicle speed are determined using data obtained from a TCU of the vehicle. For example, these parameters may alternatively or additionally be based upon data obtained from a navigation device of the vehicle or from one or more sensors connected to a digital network of the vehicle.

Accordingly, in preferred embodiments of the invention, the method comprises obtaining data indicative of an acceleration of the vehicle, and determining the forward acceleration of the vehicle from the obtained acceleration data.

The steps of the present invention in any of its aspects or embodiments may be performed by a system associated with the vehicle, such as a telematics control unit (TCU) of the vehicle, or on-board processing system of the vehicle (which may e.g. comprise a navigation system or autonomous or advanced driver-assistance module). Thus, the processing of the present invention may be performed on-board the vehicle. However, it is also contemplated that the method may be performed by a remote server. The system of the present invention may then be such a server. In yet other embodiments, the steps of the method may be performed by a combination of on-board and remote processing systems. For example, some of the steps may be performed by an on-board TCU or other system of the vehicle, and others by a remote server. Thus, the steps of the method may be performed exclusively on-board the vehicle, exclusively on a server, or some on a server and the others on an on-board device in any combination.

It will be appreciated that the present invention is preferably a computer-implemented invention. Any of the steps described in relation to any of the aspects or embodiments of the invention may therefore suitably be carried out under the control of a set of one or more processors and/or suitable processing circuitry. The processing circuitry may generally be implemented either in hardware or software, as desired.

Accordingly, it will be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in its various aspects is applicable to any type of vehicle including a conventional (fossil fuel) powered vehicle, e.g. petrol or diesel, a hybrid vehicle, a hydrogen powered vehicle, a fuel cell powered vehicle or, (in respect of the first and second aspects of the invention which do not necessarily require fuel consumption to be determined), an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Some preferred embodiments of the invention will now be described by reference to methods and systems for providing an indication of driving performance. These methods and systems may be used in monitoring the performance of drivers of vehicles over one or more trips, and/or in providing feedback to a driver and/or fleet manager in order to promote more responsible and/or economical driving.

Figure 1:
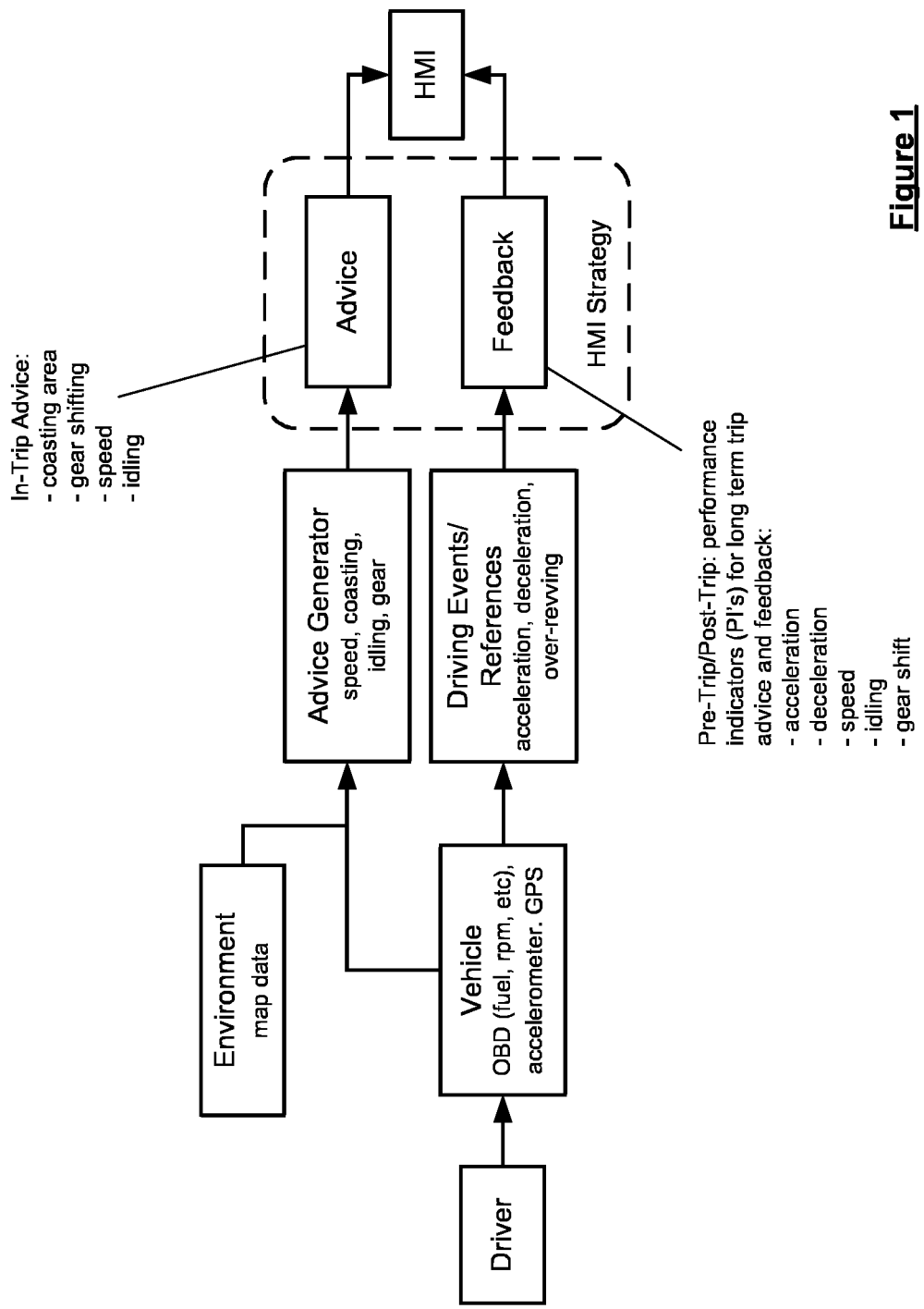
FIG. 1 is an illustration of a system for providing driver feedback.

A system for proving driver feedback is shown in FIG. 1. One example of such a system is the TomTom OptiDrive 360 system. Such systems may generate driving performance indicators which may be used various manners, e.g. to provide (e.g. real-time) feedback to the driver, and/or to enable a fleet manager to remotely monitor driving performance of vehicle drivers.

As shown in FIG. 1, the driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or "green" speed to achieve maximum economical results; times/areas when "coasting" is possible; gear choice and when to change gear; etc. The feedback may comprise counts of certain driving events. For example, driving events may be instances of harsh i.e. excessive acceleration or declaration, harsh braking or cornering, speeding events (with respect to the speed limit and/or green speed), inefficient gear changes (over-revving), etc. A severity of the driving event may be provided where applicable. The feedback may also comprise indicators as to how current and/or historic driving performance equates to predetermined goals, which may be set by the driver or may be set remotely by a fleet manager.

The invention is directed to the generation of a new performance indicator for use in providing driver feedback, and to methods for determining data for use in the generation of such a performance indicator. A summary of each of the aspects of the invention is given below:

The determination of a forward acceleration threshold value to determine a driving event indicative of excessive forward acceleration The estimation of a mass of a vehicle based on the instantaneous fuel consumption of the vehicle.

The vehicle may be of any type of vehicle including a conventional (fossil fuel) powered vehicle, e.g. petrol or diesel, a hybrid vehicle, a hydrogen powered vehicle, a fuel cell powered vehicle or an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

Figure 2:
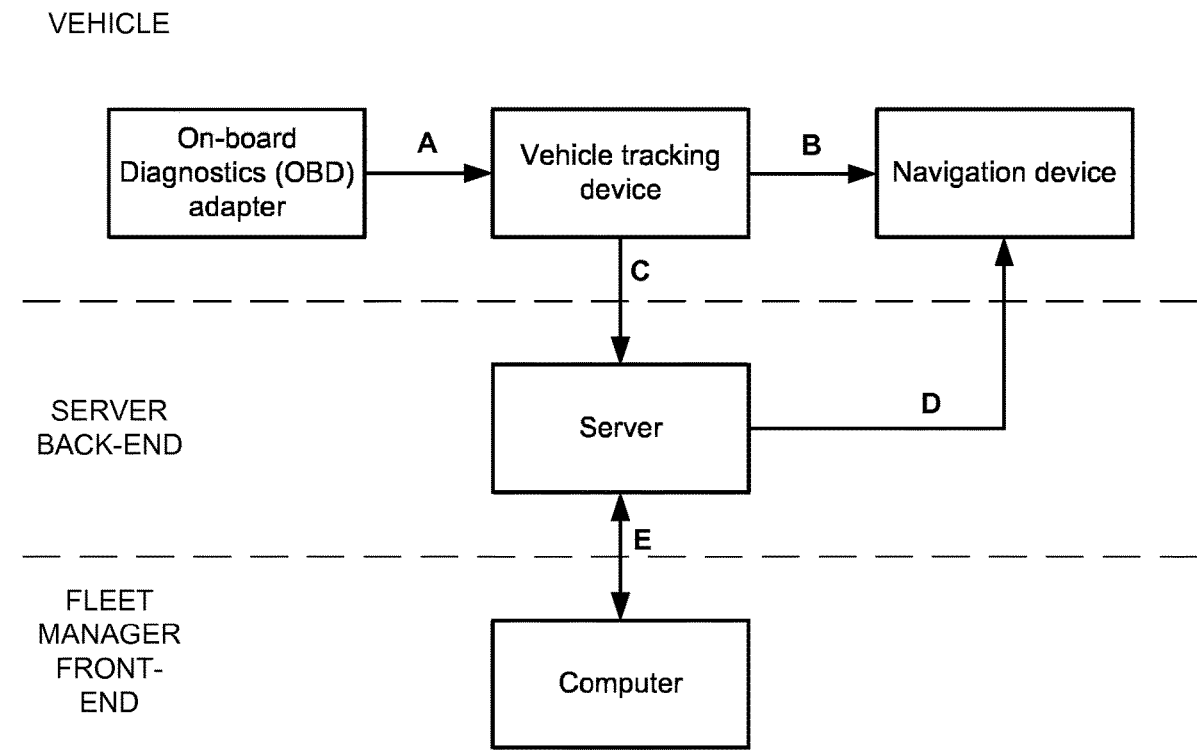
FIG. 2 is an illustration of the architecture of one implementation for providing the system of FIG. 1.

A system which may be used to implement embodiments of the invention is exemplified by FIG. 2. The vehicle can include: an on-board diagnostics (OBD) adapter; a vehicle tracking device; and a navigation device. The vehicle tracking device can be arranged to communicate with a server, which in turn is arranged to communicate with the navigation device in the vehicle and a computer, such as in the base of operations of the fleet manager. While the system the system shows three distinct devices in the vehicle: the OBD adapter; the vehicle tracking device; and the navigation device, it will be appreciated that the vehicular components of the system can be shared between a greater number or a fewer number of devices as desired. Similarly, while FIG. 2 shows data being transmitted to the server only from the vehicle tracking device, in other embodiments data can be sent to the server from any of the vehicular devices as desired. The functionality of each of the components shown in FIG. 2 will now be described in more detail.

OBD Adapter:

The adapter device comprises an interface unit for communicating with one or more systems of the vehicle. The interface unit may be removably coupleable to an OBD port of the vehicle to receive data indicative of one or more parameters associated with the vehicle. The OBD adapter may form part of a telematics control unit (TCU) of the vehicle. The OBD port provides the one or more parameters to the interface unit from a communication bus of the vehicle. It will be realised, however, that the interface unit may communicate with the vehicle via other connections such as via a wireless connection. The adapter device is therefore preferably configured to collect data from the OBD port in the vehicle, such as engine speed (rpm), and vehicle speed, and to determine other information derived from such OBD data, such as the current gear, maximum gear, fuel consumption, etc., and to deliver the data to the vehicle tracking device. In other words, the data transmitted, in a wired and/or wireless manner, to the vehicle tracking device, is indicative of a current state of the vehicle. It will be appreciated, however, that the speed of the vehicle may be determined in other ways, such as via received wireless location determining signals.

Vehicle Tracking Device:

The tracking device comprises a position determining device, such as a global navigation satellite system (GNSS) receiver, e.g. GPS or GLONASS. It will be appreciated, however, that other means may be used, such as using the mobile telecommunications network, surface beacons or the like. The positioning determining device generates tracking data, such as time-stamped positions, indicative of the change in position of the device over time. The tracking device further comprises one or more communication devices that are arranged to communicate with the OBD adapter, the navigation device and the server, either using a wired or wireless connection. The one or more communication devices can comprise a short range wireless transceiver, such as a Bluetooth transceiver, e.g. for communicating with the OBD adapter and the navigation device, and can comprise a mobile telecommunications transceiver, such as a GPRS or GSM transceiver, e.g. for communicating with the server. The tracking device further comprises at least one processor arranged to aggregate certain data for use in the subsequent generation of certain performance indicators. The vehicle tracking device may form part of a telematics control unit (TCU) of the vehicle.

Navigation Device:

The navigation device comprises at least one processor and a display device. The navigation device may be capable of one or more of: calculating a route to be travelled to a desired destination; and providing navigation instructions to guide the driver along a calculated route to reach a desired destination. The at least one processor is arranged to cause performance indicators (e.g. obtained from the server) to be displayed on the display device, e.g. before, during and/or after a trip.

Server:

The server comprises at least one processor and a communications device for communicating with one of more of the vehicular devices, preferably the vehicle tracking device.

Computer:

The computer is in communication with the server, and is used by a fleet manager to review the performance of the drivers of their fleet of vehicles based on the determined performance indicators.

In accordance with embodiments of the invention, the processing involved in implementing the methods, e.g. the detection of harsh forward acceleration driving events, and the generation of an indication indicative of detected events, or, in embodiments, the determination of a mass of a vehicle, may performed by a set of one or more processors of the vehicle tracking device and/or a set of one or more processors of the navigation device based on data received from the OBD adapter (and which is obtained from the OBD port of the vehicle). In embodiments the methods may be performed by a set of one or more processors of a TCU of the vehicle and/or a set of one or more processors of a navigation device of the vehicle. Alternatively or additionally, at least some of the processing involved in the methods of the present invention may be performed by a set of one or more processors at the server based on data received from the OBD adapter or vehicle tracking device.

A significant indicator of driving performance is acceleration. Harsh acceleration, in any direction, may be undesirable in terms of safety and the economy of the vehicle. The methods described herein in relation to certain embodiments of the invention are concerned with the way in which harsh forward acceleration may be determined. Harsh forward acceleration is often a precursor to rash driving and may lead to excessive fuel consumption. A determination of harsh forward acceleration may be used trigger the generation of a driving event indicative of harsh forward acceleration, which may be used in providing driver feedback and/or in driver behaviour monitoring.

The invention, in certain aspects and embodiments at least, is directed to new techniques for identifying when harsh forward acceleration has occurred for use in generating a driving event indicative of harsh forward acceleration. Such a driving event may be used in providing driver feedback in the manner described in relation to FIG. 1, and/or may be used in driver monitoring using a system of the type illustrated by reference to FIG. 2.

The forward acceleration data used in embodiments of the invention may be determined using acceleration measurements obtained by an accelerometer system associated with the vehicle. The acceleration measurements may be processed in order to obtain the forward acceleration for use in the method of the invention. For example, the accelerometer measurements obtained in the coordinate frame of the accelerometer system may be transformed into the coordinate frame of the vehicle. This may be achieved in any suitable manner. For example, one technique is described in WO 2011/003461 A1 entitled "Accelerometer system and method", and published 13 Jan. 2011, that involves collecting a plurality of acceleration samples during vehicle stand-still and using the samples to compute an average gravitation vector. Based on this average gravitation vector, the angle of rotation between the accelerometer and the horizontal vehicle plane can thus be determined. Another technique involves obtaining a plurality of acceleration measurements from the accelerometer while the vehicle is moving, each measurement being representative of acceleration as measured within a co-ordinate frame of the accelerometer system, and the distribution of the acceleration measurements used to determine an orientation of the accelerometer system relative to the vehicle within which it is installed.

The forward acceleration may be determined using acceleration measurements obtained by an accelerometer system of the tracking device and/or telematics control unit (TCU) and/or navigation device associated with the vehicle. The speed of the vehicle may similarly be determined based on vehicle speed data obtained from a tracking device and/or telematics control unit and/or navigation device of the vehicle. However, it is not necessary that the forward acceleration and vehicle speed are determined using data obtained from a TCU of the vehicle.

The Applicant has recognised that, when identifying harsh forward acceleration, rather than using a fixed threshold as vehicle speed varies, it is advantageous to use a forward acceleration threshold which varies with respect to vehicle speed. The threshold is described by a function which is in the form of a curve, such that the forward acceleration threshold decreases with increasing vehicle speed over a range of speeds.

A relationship between acceleration and vehicle speed may be obtained using the vehicle longitudinal dynamics equation of Eqn. 3.

$$\frac{T_{eng} i_g i_{fd} \eta}{r_d} = F_{areo} + F_f + F_i + F_c + F_b = \left(\frac{1}{2}\rho C_x S_x v^2\right) + (mgf) + (\delta ma) + (mg\sin\alpha) + F_b \quad \text{Eqn. 3}$$

where:

| Parameter | Description | Unit |
|---|---|---|
| $F_{aero}$ | Aerodynamic drag = $\frac{1}{2}\rho C_x S_x v^2$ | N |
| $F_f$ | Rolling resistance = mgf | N |
| $F_i$ | Inertial resistance = $\delta$ma | N |
| $F_c$ | Climbing resistance = $mg\sin\alpha$ | N |
| $F_b$ | Braking force | N | and where:

| Parameter | Description | Unit |
|---|---|---|
| $T_{eng}$ | Engine torque | Nm |
| $i_g$ | Gear ratio | — |
| $i_{fd}$ | Final drive ratio | — |
| $\eta$ | Mechanical efficiency of transmission | — |
| $r_d$ | Dynamic radius of the tyre | M |
| $\rho$ | Density of air (1.22) | kg/m$^3$ |
| $C_x$ | Air drag coefficient | — |
| $S_x$ | Surface area | m$^2$ |
| v | Speed | m/s |
| m | Mass of the vehicle | kg |
| g | Gravitational acceleration (9.81) | m/s$^2$ |
| f | Rolling resistance coefficient | — |
| $\delta$ | Inertial coefficient | — |
| a | Forward acceleration | m/s$^2$ |
| $\alpha$ | Gradient of road in degrees or rad | ° or rad |
| $F_b$ | Braking force | N |

Power is limited by the maximum power output of the engine. Thus, with increasing speed, power increases, but inertial resistance decreases. The ability of the vehicle to accelerate decreases with increasing speed. Therefore, taking K as the limiting engine power:

$$\left(\frac{T_{eng} i_g i_{fd} \eta}{r_d}\right) v = \left(\left(\frac{1}{2}\rho C_x S_x v^2\right) + (mgf) + (\delta ma) + (mg\sin\alpha) + F_b\right) v = K \quad \text{Eqn. 4}$$

It has been found that the acceleration threshold for use in identifying excessive forward acceleration may advantageously emulate this relationship. Thus, in exemplary embodiments, the function for defining the acceleration threshold emulates the relationship between vehicle speed and acceleration in a vehicle when the engine is operating at maximum power output. Typically, braking force can be neglected as it is generally zero when the vehicle is accelerating. The climbing resistance can also be omitted if slope information is not known.

Figure 3:
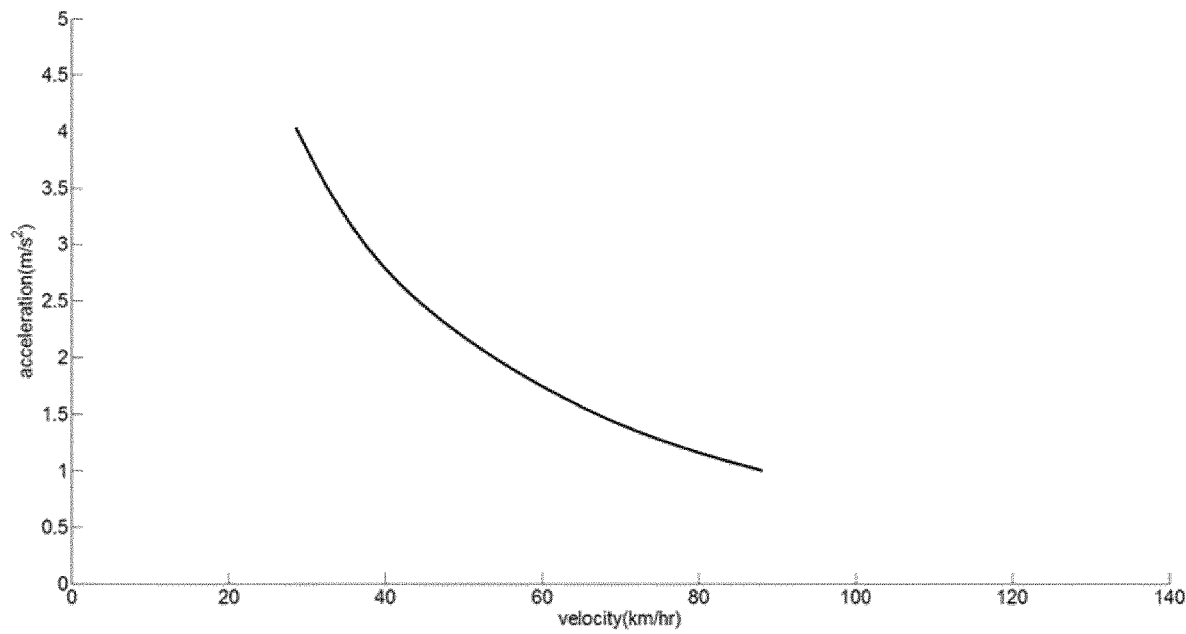
FIG. 3 illustrates a power curve for a vehicle.

FIG. 3 illustrates the relationship between acceleration and speed, based on Eqn. 4. The resultant curve is referred to herein as a "power curve".

The function used to provide a threshold for defining harsh forward acceleration in accordance with embodiments of the invention emulates this power curve. For a range of vehicle speeds in a range starting from a lower limit $v_1$, and optionally up to an upper limit $v_2$, the forward acceleration threshold is given by the function according to Equation 1B above, which is reproduced here for ease of reference:

$$A = \frac{\frac{1}{2}\rho C_x S_x (v_1^3 - v^3) + mgf(v_1 - v) + \delta m a_1 v_1 + mg\sin\alpha}{\delta m v} \quad \text{for } v \geq v_1,$$

and optionally $v < v_2$

While a harsh forward acceleration threshold could simply be defined as a percentage of the maximum power of the engine of a vehicle, this would not provide a threshold which could readily be applied to different vehicles, due to the variation in maximum power output between vehicles.

Thus, instead, in exemplary embodiments of the invention, a pair of predefined acceleration and speed values, ($v_1$, $a_1$), are defined, which define a vehicle state at which this function may start to be applicable, and defining the value of the acceleration threshold for $v = v_1$. This may help to standardize the application of the function to different vehicles. The pair of predefined acceleration and speed values may be identified empirically, e.g. by considering the extent to which speed and acceleration data obtained from vehicles correlates to the power curve. This may enable the speed of the predefined pair of values to be identified, being the speed defining the lower limit of the speed range over which the curve applies.

It has been found that it is advantageous to use a constant threshold for identifying harsh forward acceleration for lower vehicle speeds. Thus, the acceleration value of the pair of predefined acceleration and speed values is also used to provide the acceleration threshold where $v < v_1$.

Figure 4:
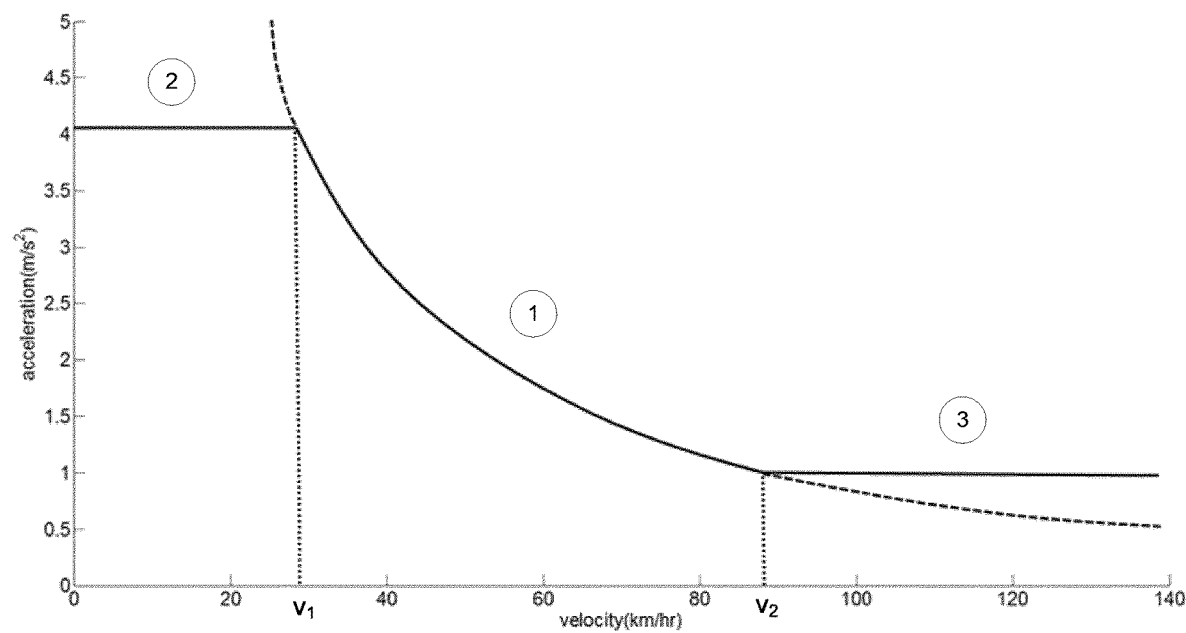
FIG. 4 illustrates the way in which the power curve may be used to provide an acceleration threshold for use in identifying harsh forward acceleration at different vehicle speeds.

FIG. 4 illustrates the way in which the threshold for determining harsh acceleration varies with respect to vehicle speed. Here it may be seen that in region 1, the threshold is given by a function emulating the power curve as described above. This curve starts from a vehicle state defined by the pair of predefined acceleration and speed values ($v_1$, $a_1$). For lower vehicle speeds, where v<$v_1$, a constant acceleration threshold corresponding to the acceleration value $a_1$ of the predefined acceleration-speed pair is used. This may provide a more realistic threshold than the exponentially increasing threshold which would result from a continuation of the power curve. Such an increasing threshold would not be realistic, as, in practice, increased inertia of the vehicle at lower speeds, adhesion limits on the road, and a torque limit of the engine would prevent acceleration from increasing exponentially as suggested by a continuation of the power curve.

It has also been found that the power curve will lead to exceedingly small values for the threshold at higher speeds, e.g. where v>$v_2$. This may lead to a large number of false positive determinations of excessive forward acceleration, and may result in an acceleration threshold that is within an experimental error of an accelerometer used to provide the acceleration data. In optional, but preferred embodiments, a constant acceleration threshold may instead be defined for use with speeds where v>$v_2$, as indicated in region 3 of FIG. 4. The value of $v_2$ may be set based on experimental observations, or taking into account inherent error measurement in the acceleration sensors.

Figure 5:
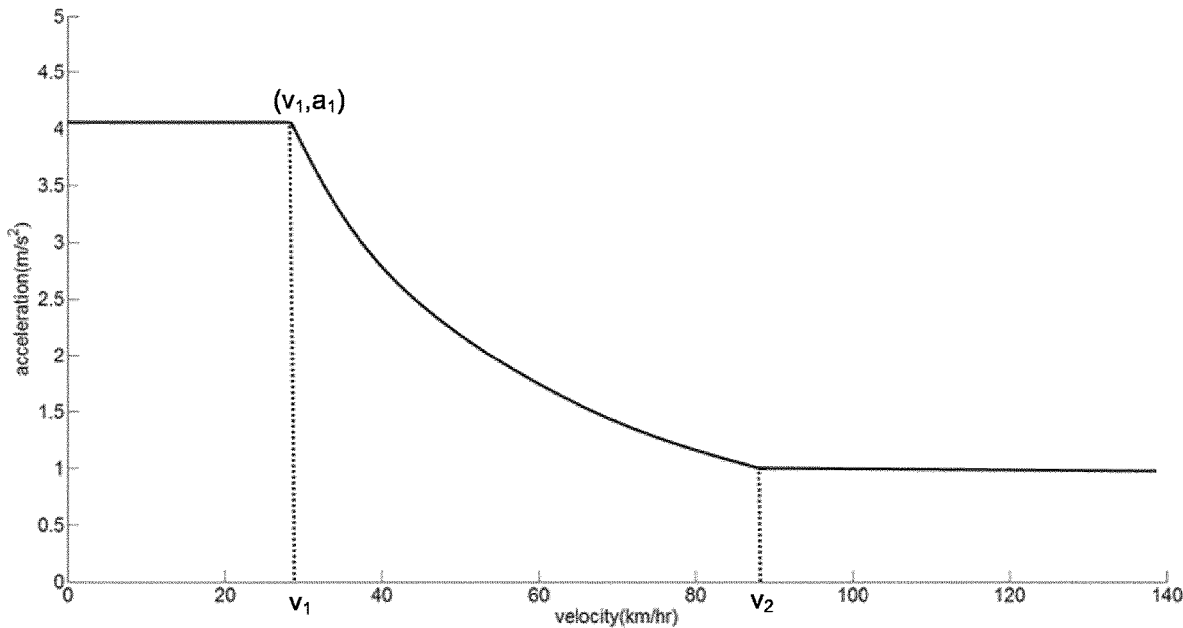
FIG. 5 illustrates the dependence of the acceleration threshold upon vehicle speed.

The resulting dependence of the acceleration threshold upon speed over the entire range of speed values, encompassing regions 1, 2 and 3 of FIG. 4, is shown in FIG. 5.

Some simplifications may be made. For example, the climbing resistance component of Equation 1B may be ignored where gradient data is not readily available, and the constant threshold for v>$v_2$ need not necessarily be used, providing the following simplified equation defining the acceleration threshold:

$$A = \frac{\frac{1}{2}\rho C_x S_x (v_1^3 - v^3) + mgf(v_1 - v) + \delta m a_1 v_1}{\delta m v} \text{ for } v \geq v_1$$

The function used in accordance with the invention to determine excessive forward acceleration therefore varies according to a speed of the vehicle over a range of speeds. This is in contrast to techniques for providing a harsh acceleration threshold in the context of braking or cornering, i.e. other than for forward acceleration, where a constant threshold may be used over a range of vehicle speeds. Thus, it is recognised that an acceptable magnitude of forward acceleration of the vehicle at a low speed may not be acceptable at a higher speed. The threshold for harsh forward acceleration decreases with increasing vehicle speed over a range of vehicle speeds. It will be appreciated that the engine power of the vehicle is limited. Thus, more power is required for the same magnitude of forward acceleration at higher speed than at lower speed. The same forward acceleration at higher speed consumes more fuel. The varying threshold used in accordance with the invention reflects this, and enables a harsh forward acceleration driving event to be generated for lower forward acceleration values at higher speeds. This enables feedback to be provided to the driver in an improved manner which may promote a more economical driving style.

Figure 6:
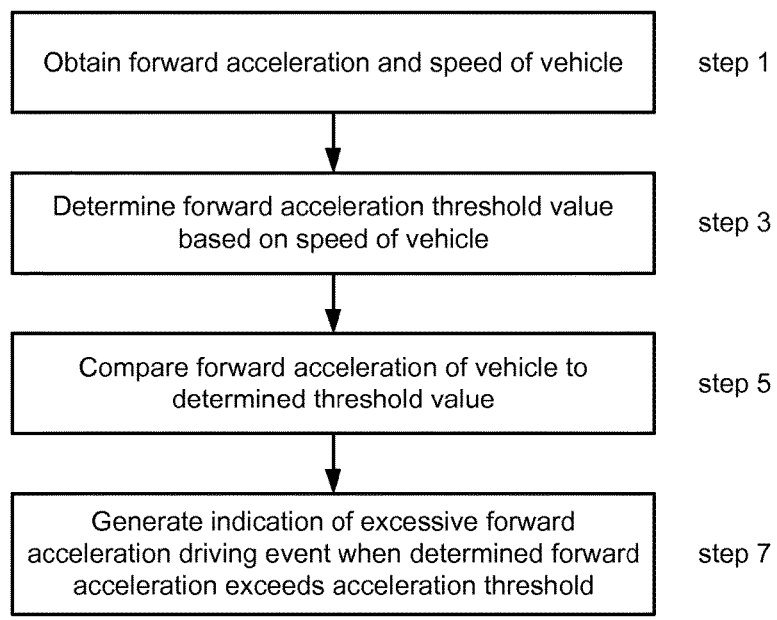
FIG. 6 is a flowchart indicating one way in which an acceleration threshold may be used to identify excessive forward acceleration.

The way in which the threshold may be used in accordance with the invention will now be described by reference to FIG. 6. FIG. 6 is a flowchart illustrating a sequence of steps.

This process may be performed on-board a vehicle, or at a server, or combination thereof, as described above.

In step 1, the forward acceleration and speed of the vehicle are obtained. These may be obtained from the vehicle CAN bus using an OBD adapter or tracking device of the vehicle, for example.

In step 3, the current speed of the vehicle is used to identify the forward acceleration threshold for use for that speed, i.e. from the dependence of the threshold upon vehicle speed as shown in FIG. 5.

In step 5 the forward acceleration of the vehicle is compared to the determined threshold value.

In step 7, an indication of an excessive forward acceleration driving event is generated where the determined forward acceleration exceeds the applicable forward acceleration value. This step may be performed whenever, and as soon as, the applicable threshold is exceeded, or it may be required that the threshold is exceeded for a predetermined time period, e.g. 3 seconds before the driving event indication is triggered to be generated.

The driving event may be transmitted, e.g. to the navigation device and/or server for use in providing feedback to the driver and/or for monitoring driver behaviour.

Figure 7:
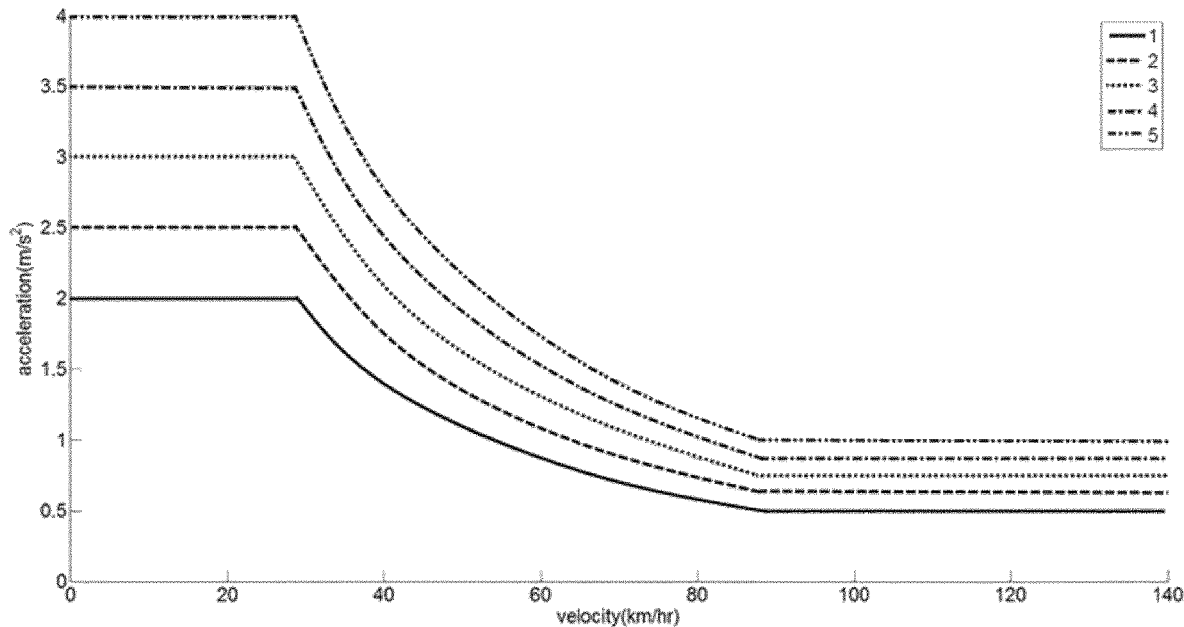
FIG. 7 illustrates a set of acceleration thresholds which may be used to identify a severity level association with a harsh forward acceleration driving event.

It has been found that it is advantageous to be able to provide some indication of the severity of a forward acceleration driving event. Thus, in some embodiments, as shown in FIG. 7, a plurality of thresholds are used, each associated with a given severity level. Each has the same general speed dependence as shown in FIG. 5, but is defined using Eqn. 1A or 1B, but with a different pair of predefined acceleration and speed values. In the illustrated embodiment, the speed value of the pair of predefined acceleration speed values is the same for each function, such that the curved portion begins at the same speed, but the acceleration value at this starting point differs, such that each function has a different starting point, i.e. acceleration value where v=$v_1$. As with the FIG. 5 example, the acceleration value, i.e. the forward acceleration threshold, where v=$v_1$ is also used as the constant acceleration threshold value for lower values of speed. A constant acceleration threshold may optionally also be used in each case where v>$v_2$. For any given value of speed, a set of different threshold values is provided.

A method using a set of thresholds with speed dependence as shown in FIG. 7 would proceed as described in relation to FIG. 6. However, in step 3, each forward acceleration threshold value for the vehicle speed is obtained, and in step 5, the forward acceleration of the vehicle is compared to each such threshold value. If any of the thresholds is exceeded, an excessive forward acceleration driving event is generated in step 7. A severity of the event is identified based upon the highest threshold which was exceeded. Data indicative of the severity of the event may be associated with the generated event indication, and used to provide feedback to the user indicative of the severity of the event, e.g. a colour coded warning, etc., and/or is used in monitoring driver behaviour. As described by reference to FIG. 5, a severity may only be triggered where the applicable threshold is exceeded for a predetermined time period.

It will be seen that the harsh acceleration threshold, and, where applicable severity levels, are set to discourage high acceleration at moderate or high speeds more heavily than high accelerations at low speeds.

It will be appreciated that equations 1A and 1B, and hence the forward acceleration threshold function, are dependent upon the mass of the vehicle. There are various ways in which a mass may be determined for a particular vehicle. For example, one of a set of predefined vehicle masses may be used based on vehicle class. A user may be provided with the option to manually update the mass if the actual mass is known. However, the mass of a vehicle may fluctuate considerably over time, e.g. based upon the size of a load being carried, a fuel load, number of passengers, etc. This is particularly likely where the vehicle is part of an operational fleet. In order to address this issue, a driver may be offered the option to specify the mass of the vehicle within a range of mass values for the vehicle between predefined minimum and maximum values, dependent upon, for example, the load being carried. For example, the driver may be able to set an intermediate value, e.g. percentage, based upon the perceived load of the vehicle. However, in some further embodiments, the present invention provides a way of automatically estimating vehicle mass. The mass estimated in accordance with these techniques may be used in obtaining forward acceleration thresholds as described above, or in other contexts where it is required to know vehicle mass, e.g. to obtain acceleration thresholds in respect of braking or cornering, in determining other driving performance indicators not related to acceleration, e.g. in relation to braking or steering in general, or in other contexts, e.g. fuel consumption determination. Being able to automatically estimate mass enables, for example, thresholds for use in such determinations to be made more dynamic. In some applications, knowledge of mass is advantageous in its own right, and may not necessarily be used in further calculations, e.g. to provide a current estimate of mass of a lorry where this is required by regulation.

The power for a vehicle, e.g. as denoted by Equation 4, can also be calculated using fuel consumption. This leads to:

$$f_{rate}\eta_t C = \left(\left(\frac{1}{2}\rho C_x S_x v^2\right) + (mgf) + (\delta ma) + (mg\sin\alpha) + F_b\right)v \quad \text{Eqn. 5}$$

and, after rearranging, to the mass of the vehicle being determined according to:

$$m = \frac{\frac{f_{rate}\eta_t C}{v} - \frac{1}{2}\rho C_x S_x v^2 - F_b}{g\sin\alpha + \delta a + gf} \quad \text{Eqn. 2}$$

where:

| Parameter | Description | Unit |
|---|---|---|
| $f_{rate}$ | Rate of fuel consumption | kg/s |
| $\eta_t$ | Tank to wheel efficiency | — |
| C | Fuel calorific value | J/kg |
| $\rho$ | Density of air (1.22) | kg/m³ |
| $C_x$ | Air drag coefficient | — |
| $S_x$ | Surface area | m² |
| v | Speed | m/s |
| m | Mass of the vehicle | kg |
| g | Gravitational acceleration (9.81) | m/s² |
| f | Rolling resistance coefficient | — |
| $\delta$ | Inertial coefficient | — |
| a | Forward acceleration | m/s² |
| $\alpha$ | Gradient of road in degrees or rad | ° or rad |
| $F_b$ | Braking force | N |

Typically, braking force can be neglected as it is generally zero when the vehicle is accelerating. The climbing resistance can also be omitted if slope information is not known. This leads to:

$$m = \frac{\frac{f_{rate}\eta_t C}{v} - \frac{1}{2}\rho C_x S_x v^2}{\delta a + gf} \quad \text{Eqn. 6}$$

It will be seen that the vehicle mass for a given time is dependent upon fuel consumption, i.e. fuel consumption rate, and the vehicle forward acceleration and speed. The mass is also dependent upon the efficiency of the engine. This may vary dependent upon a state of the engine, and is dependent upon engine type.

It has been recognised that highest efficiencies are achieved at high throttle, i.e. when the engine is operating at high load. By filtering forward acceleration and speed data for vehicles so as to obtain only data corresponding to high loads, it is possible to assume that the efficiency of the engine is at its highest, thus simplifying the mass determination.

Thus, in accordance with the invention, forward acceleration and speed data for a vehicle is filtered, and only that data relating to times where the forward acceleration is above a predefined threshold, and optionally also the speed data is above a predefined threshold, is used in determining the vehicle mass. The data is used together with the fuel consumption data for the applicable time.

Figure 8:
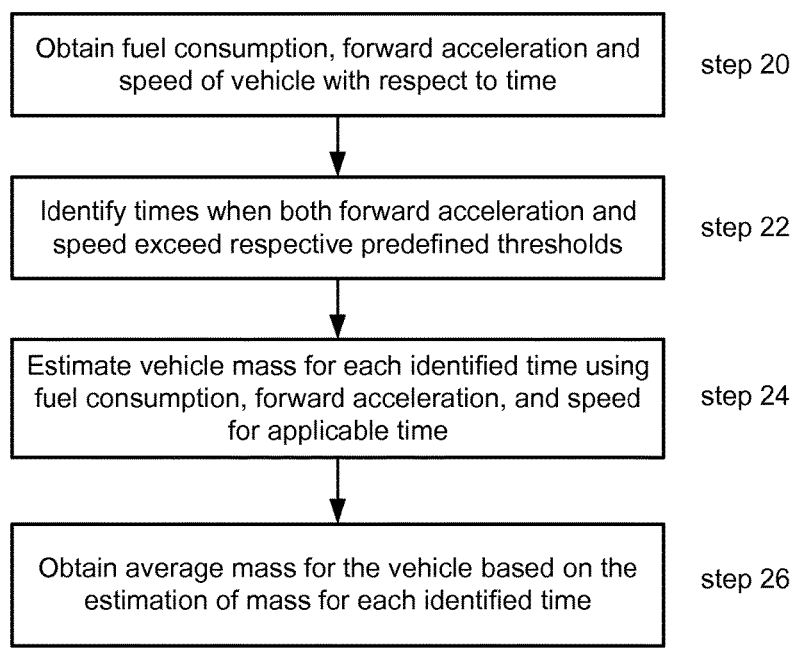
FIG. 8 is a flowchart illustrating the steps of a method for estimating vehicle mass in accordance with an embodiment of the invention.

FIG. 8 is a flowchart illustrating the steps in the method for determining mass in more detail.

In step 20, vehicle fuel consumption, forward acceleration and speed data is obtained with respect to time. This may be via a live feed, e.g. of time stamped data. Such data may be obtained from the CAN bus of the vehicle, or determined from OBD data, e.g. via an OBD adapter of the vehicle.

In step 22 those times where vehicle speed exceeds a predefined threshold, or both vehicle speed and vehicle forward acceleration exceed respective predefined thresholds, are identified.

In step 24, vehicle mass is estimated for each identified time, using the fuel consumption, forward acceleration and speed data for that time. This may be achieved using equation 2, with the assumption that tank to wheel efficiency is at its maximum.

In step 26, an average mass is obtained for the vehicle based on the estimation of mass for each identified time.

Steps 22 and 24 may be repeated multiple times in each trip, such that the average mass obtained in step 26 is an average mass based on a plurality of mass estimations made during the trip. The resulting mass estimation may be used in determining thresholds for use in providing driving performance indications for use in driver feedback and/or monitoring, whether for forward acceleration (e.g. using the method described by reference to FIGS. 1 to 7), or otherwise, or may be used in any context where a dynamic estimation of vehicle mass is useful.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Whilst some embodiments described in the foregoing detailed description refer to GPS, it should be noted that the navigation device may utilise any kind of position sensing technology as an alternative to (or indeed in addition to)

GPS. For example the navigation device may utilise using other global navigation satellite systems such as the European Galileo system. Equally, it is not limited to satellite based but could readily function using ground based beacons or any other kind of system that enables the device to determine its geographic location.

It will also be appreciated that embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst embodiments described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will thus be understood that the present invention has been described above purely by way of example, and modifications of detail can be made within the scope of the invention. Each feature disclosed in the description, and (where appropriate) the claims and drawings may be provided independently or in any appropriate combination. Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

Thus, although the present invention has been described with reference to various embodiments, it will be understood by those skilled in the art that various changes in form and detail may be made without departing from the scope of the invention as set forth in the accompanying claims. It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A non-transitory computer readable medium having a computer program product stored therein, the computer program product comprising instructions which, when executed by one or more processors of a system, cause the system to, during a trip undertaken by a vehicle, continually:
    obtain a forward acceleration and speed of the vehicle;
    determine whether the obtained speed of the vehicle is within a range of vehicle speeds, and, when the obtained speed of the vehicle is within the range of vehicle speeds:
        calculate the vehicle forward acceleration threshold value using an acceleration threshold function,
        wherein the acceleration threshold function takes the obtained speed of the vehicle as a variable input, and provides the vehicle forward acceleration threshold value as an output,
        wherein, according to the acceleration threshold function, the vehicle forward acceleration threshold value varies continuously with the obtained speed of the vehicle and decreases with increasing vehicle speed over the range of vehicle speeds;
    comparing the obtained forward acceleration of the vehicle with the calculated vehicle forward acceleration threshold value; and
    generating an indication of an excessive forward acceleration driving event when the obtained forward acceleration exceeds the calculated vehicle forward acceleration threshold value.

2. The non-transitory computer readable medium of claim 1, wherein the vehicle forward acceleration threshold value according to the acceleration threshold function defines a curve over the range of vehicle speeds.

3. The non-transitory computer readable medium of claim 1, wherein the acceleration threshold function includes an aerodynamic drag component, a rolling resistance component, an inertial resistance component, and a climbing resistance component.

4. The non-transitory computer readable medium of claim 1, wherein the acceleration threshold function is based on a pair of predefined acceleration and speed values and is defined such that, when the obtained speed is the predefined speed value, the vehicle forward acceleration threshold is the predefined acceleration value.

5. The non-transitory computer readable medium of claim 4, wherein the predefined speed value of the predefined pair of acceleration and speed values corresponds to a lower limit of the range of vehicle speeds.

6. The non-transitory computer readable medium of claim 4, wherein the vehicle forward acceleration threshold value is defined by a constant predefined threshold for vehicle speeds less than the predefined speed value.

7. The non-transitory computer readable medium of claim 6, wherein:
    the acceleration threshold function is based on a pair of predefined acceleration and speed values and is defined such that, when the obtained speed is the predefined speed value, the vehicle forward acceleration threshold is the predefined acceleration value, and
    the constant predefined threshold value corresponds to the acceleration value of the predefined pair of acceleration and speed values.

8. The non-transitory computer readable medium of claim 1, wherein the range of vehicle speeds over which the acceleration threshold function is used to determine the vehicle forward acceleration threshold has an upper limit, and, when the vehicle speed exceeds the upper limit, a constant acceleration threshold is used.

9. The non-transitory computer readable medium of claim 1, wherein the indication of an excessive acceleration driving event is generated when the obtained forward acceleration exceeds the determined vehicle forward acceleration threshold value for more than a predetermined time period.

10. The non-transitory computer readable medium of claim 1, comprising calculating a plurality of vehicle forward acceleration threshold values for use in identifying excessive forward acceleration of the vehicle based on the obtained speed of the vehicle, wherein each vehicle forward acceleration threshold value is in respect of a different severity level, and each severity level is associated with a respective pair of predefined acceleration and speed values, wherein each forward acceleration threshold value is calculated using the acceleration threshold function with the applicable pair of predefined acceleration and speed values.

11. The non-transitory computer readable medium of claim 1, comprising using the generated indication to display output to a user indicative of the harsh acceleration driving event, and optionally the severity of the event.

12. The non-transitory computer readable medium of claim 1, comprising obtaining data indicative of an acceleration of the vehicle, and determining the forward acceleration of the vehicle from the obtained acceleration data.

13. A non-transitory computer readable medium having a computer program product stored therein, the computer program product comprising instructions which, when executed by one or more processors of a system, cause the system to, during a trip undertaken by a vehicle, continually:
  obtain a forward acceleration and speed of the vehicle;
  determine whether the obtained speed of the vehicle is within a range of vehicle speeds, and, when the obtained speed of the vehicle is within the range of vehicle speeds:
    calculate the vehicle forward acceleration threshold value using an acceleration threshold function, wherein the acceleration threshold function is dependent upon a mass of the vehicle;
    estimate the mass of the vehicle for use in the acceleration threshold function using data indicative of an energy consumption of the vehicle;
    wherein the acceleration threshold function takes the obtained speed of the vehicle as a variable input, and provides the vehicle forward acceleration threshold value as an output;
    wherein, according to the acceleration threshold function, the vehicle forward acceleration threshold value varies continuously with the obtained speed of the vehicle and decreases with increasing vehicle speed over the range of vehicle speeds;
  comparing the obtained forward acceleration of the vehicle with the calculated vehicle forward acceleration threshold value; and
  generating an indication of an excessive forward acceleration driving event when the obtained forward acceleration exceeds the calculated vehicle forward acceleration threshold value.

14. The non-transitory computer readable medium of claim 13, wherein estimating the mass of the vehicle further comprises using the obtained forward acceleration and speed of the vehicle.

15. The non-transitory computer readable medium of claim 13, wherein the instructions, when executed by the one or more processors, cause the system to:
  obtain an energy consumption of the vehicle; and
  use, when the forward acceleration of the vehicle is above a predefined threshold, and optionally additionally when the speed of the vehicle is above a predefined threshold, the energy consumption, forward acceleration, and speed of the vehicle to determine an estimate of the mass of the vehicle.

16. The non-transitory computer readable medium of claim 13, wherein a mass estimation is obtained for each one of a plurality of identified or different times, and the instructions, when executed by the one or more processors, cause the system to obtain an average mass based upon the plurality of mass estimations.

17. The non-transitory computer readable medium of claim 16, wherein different times is a time during a single trip.

18. The non-transitory computer readable medium of claim 13, wherein the energy consumption data is real time energy consumption data.

* * * * *